Aug. 9, 1927.
C. C. CURTIS
1,638,184
TRAP PLACING TOOL
Filed March 11, 1927
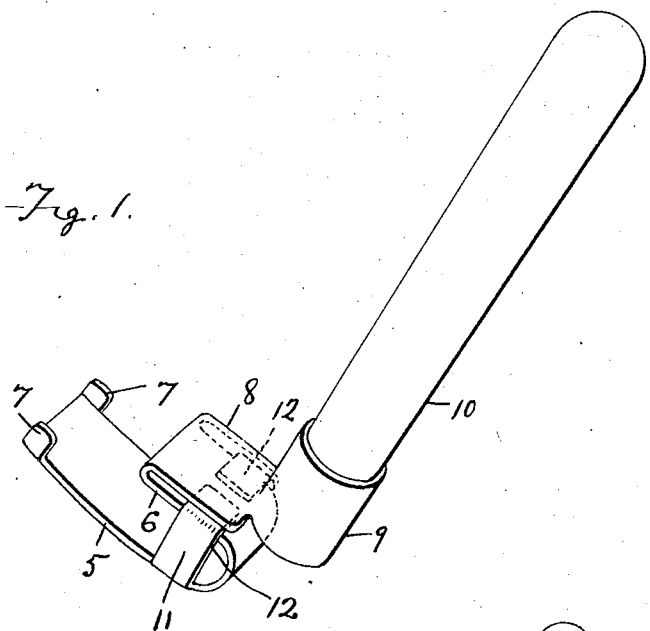
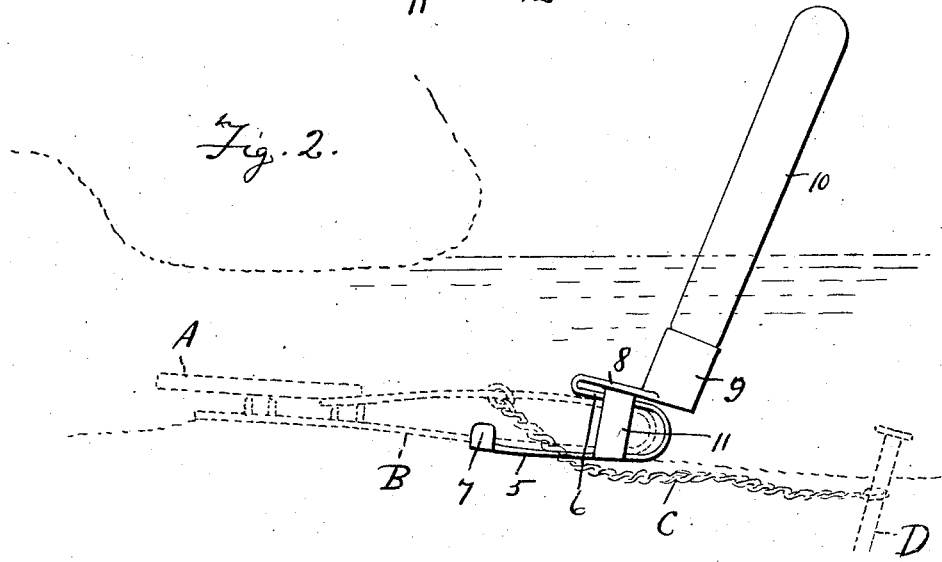
Inventor
Claude C. Curtis.
By Clarence A. O'Brien
Attorney Patented Aug. 9, 1927.

1,638,184

UNITED STATES PATENT OFFICE.

CLAUDE C. CURTIS, OF SILVER LAKE, NEW YORK.

TRAP-PLACING TOOL.

Application filed March 11, 1927. Serial No. 174,565.

This invention relates to new and useful improvements in tools for placing traps of the spring-actuated jaw character and aims to provide highly novel, simple and inexpensive means for facilitating the positioning of traps after being set for the capture of all water animals for overcoming the necessity of placing the hands and arms in the cold water.

A further and important object is to provide a tool of this character for use in the retrieving of the trap after the animal has been caught, the trap engaging end of the tool being so constructed as to permit the use of the same for submerging rats, small animals, and the like that have not been killed by their capture in the trap, and that have not been drowned by reason of their capture within the water.

A tool of this character is further adaptable to use in the raking of grass and leaves out of animal run-ways for providing a proper bed for the placement of the traps.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts in both of the views:

Figure 1 is a perspective of a trap placing tool constructed in accordance with the present invention, and Figure 2 is a side elevation thereof as actually associated with a trap disposed beneath the water surface, which trap is disclosed in dotted lines.

Now having particular reference to the drawing there is disclosed in dotted lines in Figure 2, a conventional type of spring actuated jaw trap, the jaw shown being designated A, while the spring is designated B, this spring being of the conventional turned-over leaf character, and a detailed description theerof is believed unnecessary.

In use of traps of this character for catching under-water-animals, the upper portion of the spring leaf B at a point intermediate its ends has attached thereto one end of anchoring chain C of predetermined length, the opposite end thereof being suitably anchored by a stake D. My invention per se is constructed of a narrow strip of spring steel so bent as to provide spaced parallel jaws 5 and 6, the lower one of which extends considerably beyond the upper jaw at the forward end thereof, which lower jaw is formed at its outer end and opposite edges with upturned lugs 7—7. The material forming the head of the tool is bent rearwardly over the upper jaw 6 in spaced relation therewith as at 8, and formed upon the outer end thereof is an upwardly extending circular socket 9 for receiving one end of a suitable handle 10. Formed upon the opposite edges of the lower elongated jaw 5 are upwardly extending metallic strips for forming fingers 11, the upper ends of which are bent inwardly as at 12 above the upper jaw 6 and beneath the rearwardly bent portion of the material forming the head which is in spaced relation with said jaw 6 as clearly disclosed in both of the views.

In actual practice after the trap disclosed by dotted lines in Figure 2 has been set, the spring B is disposed longitudinally and frictionally between the jaws 5 and 6. The lugs 7—7 engaging upon opposite edges of the lower portion of the spring for preventing the turning of the same within said jaws.

By grasping the handle 10, this trap may then be placed upon the floor of a stream or other shallow body of water to which said trap is anchored by reason of the chain C and stake D. After the trap has been disposed upon the bottom of the stream the handle 10 may be tilted slightly forwardly, for disengaging the lugs 7—7 from the opposite edges of the lower portion of the spring B, after which the tool may be then drawn rearwardly for releasing the same from the spring. After the animal has been caught, the head of the tool may be engaged beneath the water surface and so manipulated as to force the spring B between the jaws for facilitating the lifting of the trap from the water. Furthermore, when it is desired to clear the bottom of the stream from grass, leaves and the like so as to provide a flat surface for the trap, the head of this tool may be employed as a rake or scraping tool.

It will thus be seen that I have provided a highly novel, simple, tool that is well adapted for all the purposes heretofore designated, even though I have herein shown and described the invention as consisting of certain detail structural elements, it is nevertheless to be understood that minor changes may be made therein without affecting the spirit and scope of the appended claims.

Having thus described the invention, what I claim is:—

1. In a trap placing tool of the character described, a pair of spaced jaw members for receiving the bight portion of a trap turned over leaf spring and a handle associated with one of said jaw members to facilitate the raising or lowering of the trap, and means upon the forward end of one of the jaw members for engagement over opposite edges of the leaf spring so as to prevent the turning of the spring within said jaws.

2. In a trap placing tool of the character described, a strip of spring metal so bent upon itself as to provide a pair of spaced spring jaws for receiving the bight portion of a trap leaf spring, means associated with the end of one of the jaws for engagement over the edges of the trap spring, and means whereby a handle member may be associated with one of said jaws.

3. In a trap placing tool of the character described, a strip of spring metal so bent upon itself as to provide a pair of spaced spring jaws for receiving the bight portion of a trap leaf spring, means associated with the end of one of the jaws for engagement over the edges of the trap spring, means whereby a handle member may be associated with one of said jaws, and means between the jaws for limiting the expansion of the same.

4. In a trap placing tool of the class described, an arm formed from a single strip of spring metal so bent as to form upper and lower jaws disposed in spaced relation, the forward end of the lower jaw being projected beyond the outer forward end of the upper jaw, said spaced jaws adapted to receive the bight portion of a jaw top spring, and a laterally extending handle receiving sprocket formed from the strip.

5. In a trap placing tool of the class described formed from a single strip of spring metal, so bent as to form a pair of spaced jaws between which is received the bight portion of a jaw trap spring, the lower jaw being of greater length than the upper jaw, the free end portion of the upper jaw being bent back upon itself and so constructed as to provide a handle receiving socket.

6. In a trap placing tool of the class described formed from a single strip of spring metal, as to form a pair of spaced jaws between which is received the bight portion of a jaw trap spring, the lower jaw being of greater length than the upper jaw, the free end portion of the upper jaw being bent back upon itself and so constructed as to provide a handle receiving socket, and lugs extending upwardly from the side edges of the outer end portion of the lower jaw for engagement with the respective side edges of the trap spring to prevent the turning of the spring within the jaws.

In testimony whereof I affix my signature.

CLAUDE C. CURTIS.